Jan. 29, 1929.

S. BROWN 1,700,712

INDICATOR FOR AUTOMOBILE LUBRICATION

Filed March 5, 1928

Inventor;
Stewart Brown,
by Chas. O. Sherry
his Atty.

Patented Jan. 29, 1929.

1,700,712

UNITED STATES PATENT OFFICE.

STEWART BROWN, OF CHICAGO, ILLINOIS.

INDICATOR FOR AUTOMOBILE LUBRICATION.

Application filed March 5, 1928. Serial No. 259,052.

This invention relates to indicators for automobile lubrication, and its principal object is to provide simple and practical means for keeping track of the length of running time that oil is used for lubricating the moving parts of automobile motors, so that the oil may be drained from the crank case at predetermined intervals. It is well known that efficient operation of an automobile motor depends, in a measure, upon proper lubrication of the moving parts thereof, and that the oil deteriorates from usage and must be replaced with fresh oil after the motor has been operated for a certain length of time.

It has been found that when an automobile has traveled five hundred miles, or thereabouts, with a supply of oil, the lubricating properties of the oil will become impaired to such an extent that in order to obtain proper lubrication for the motor it becomes highly desirable to replace the oil supply with a fresh one. Many attempts have been made to keep a record of the time for changing the oil, but these are unsatisfactory and often the records are misplaced and the user forgets to change the oil at the proper time, often with disastrous results to the motor.

In accordance with the present invention, an indicator is provided which may be attached to some convenient place on the automobile structure, as, for instance, the instrument board, where it is always visible and may be observed at all times. Whenever fresh oil is supplied to the motor, the indicator may be set so as to bear a certain relation to the mileage indicated on the speedometer of the automobile, so that when the mileage indicated on the speedometer corresponds with that shown on the indicator, the user is informed of the fact that the time has come for changing the oil in the crank shaft.

The invention consists, therefore, in an indicator for automobile lubrication having indicating means which may be set to indicate mileage having a definite relation to the mileage of the automobile, whereby the user may ascertain the time when it is necessary to replace the oil in the crank case. The invention further consists in the several novel features hereinafter fully set forth and claimed.

The invention is clearly illustrated in the drawing accompanying this specification in which—

Figure 1:
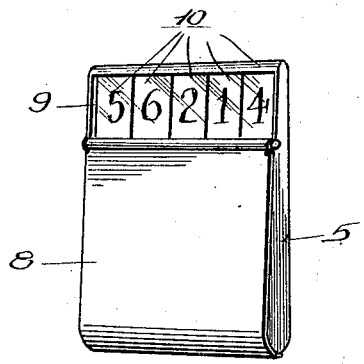
Figure 1 is a perspective view of the indicator for automobile lubrication illustrating a simple embodiment of the present invention.
Figure 2:
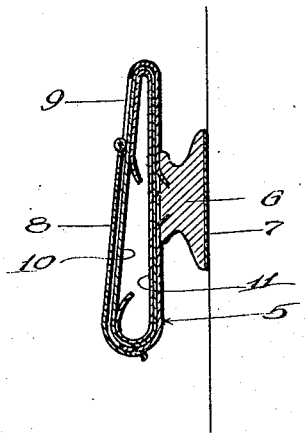
Fig. 2 is a central vertical cross section taken through the same.
Figure 3:
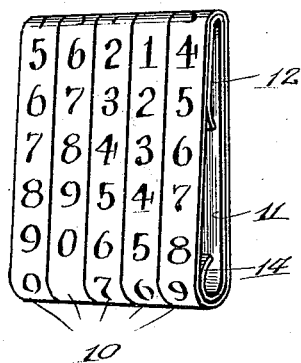
Fig. 3 is a perspective view of a band holding member and a series of endless bands mounted thereon.
Figure 4:
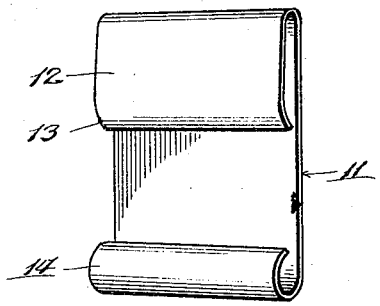
Fig. 4 is a perspective view of the band holding member alone.

Referring to said drawing, the reference character 5 designates a case provided with a suitable supporting member 6, whereby it may be attached to some portion of an automobile structure, as, for instance, the instrument board. The supporting member may be of any suitable construction, and, as shown, comprises a block secured to the back of the case and having an adhesive substance 7 on one face, whereby it may be secured to the surface of the support. The case 5 may be of any suitable form of construction, and, as a preference, is provided with a lid or cover 8 which furnishes access to its interior. In the front of the case is a sight opening 9 through which the numerical characters, indicating mileage, are visible.

Within the case is a series of endless bands 10 on each of which is displayed the digits 0 to 9, which endless bands are mounted upon a carrier or band holding member 11 removably secured in the interior of the case. The band holding member 11 may comprise a strip of metal of the same width as the width of the interior of the case and having its upper end bent down upon itself to form a flat portion 12 located behind the sight opening 9 and extending parallel with the front of the case. The lower edge portion 13 of the part 12 may be curved inward so as to form a smooth edge for the part 12.

The lower edge portion 14 of the band holding member is curved upward and in so as to provide a smooth curved part for the lower part of the band holding member. The endless bands 10 are of such dimensions that when placed upon the band holding member, they are held fairly taut thereon and occupy the entire space across the width of the interior of the case. The band holding member with the endless band thereon is frictionally secured between the upper and lower curved end walls of the case. The band holding member with the endless bands thereon is inserted into the case and the lid or cover closed. The digits which indicate the mileage, are visible through the sight opening 9, the remainder being hidden by the elements of the case.

In use, the band holding member with the endless bands thereon is removed from the case and the bands adjusted on the holder so as to bring the desired number at the upper end thereof in such position that it will be visible through the sight opening 9 when the band holding member has been inserted into the case. This is done each time the oil in the motor is replaced with fresh oil.

At the time the oil is changed, the user observes the number of miles indicated on the speedometer of the automobile and sets the indicator so as to indicate a particular mileage as, for instance, five hundred miles beyond the mileage shown by the speedometer. When the mileage on the speedometer corresponds with the mileage indicated on the indicator, the driver is reminded that it is time to change the oil. The indicator being mounted upon the instrument board, it is always under the observation of the driver and reminds him of the time when the oil should be changed.

From the above, it is apparent that little effort is required to keep a record of the time for changing oil in the motor, and that the work of resetting the indicator takes but a moment of time. It is simple, comparatively inexpensive and forms a highly desirable advertising medium.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. In an indicator for automobile lubrication, a case having a supporting element adapted for attachment to an automobile structure, said case being provided with a single sight opening, a band holding member removably secured in said case, and a series of endless bands arranged side by side and adjustably mounted on said band holding member, each endless band having disposed thereon the digits from 0 to 9, said sight opening being proportioned to display one row of said digits.

2. In an indicator for automobile lubrication, a case having a supporting element adapted for attachment to an automobile structure, said case being provided with a single sight opening and with a lid, a band holding member removably secured in said case, and a series of endless bands arranged side by side and adjustably mounted on said band holding member, each band having displayed thereon the digits from 0 to 9, said sight opening being proportioned to display one row of said digits.

3. In an indicator for automobile lubrication, a case adapted for attachment to an automobile structure, and having a single sight opening at its upper end and a lid below said sight opening, a band holding plate having its upper end portion folded upon itself to provide a flat part located behind said sight opening and having its lower edge portion curved upwardly, and a series of endless number bearing bands arranged side by side and adjustably mounted on said band holding member, said sight opening being proportioned to display one row of said digits.

4. In an indicator for automobile lubrication, a case adapted for attachment to an automobile structure, said case having upper and lower curved end walls, a sight opening adjacent the upper end and a lid below said sight opening, a band holding plate having curved end portions, and a series of endless number bearing bands arranged side by side and adjustably mounted on said band holding member, said band holding member with the bands thereon engaging the curved end walls of the case and being removably secured in the interior of said case between the upper and lower curved end walls thereof.

STEWART BROWN.